Nov. 10, 1953
H. C. LEHDE
2,658,996
BIDIRECTIONAL RECTIFIER AND PHASE DETECTOR
Filed Sept. 27, 1949
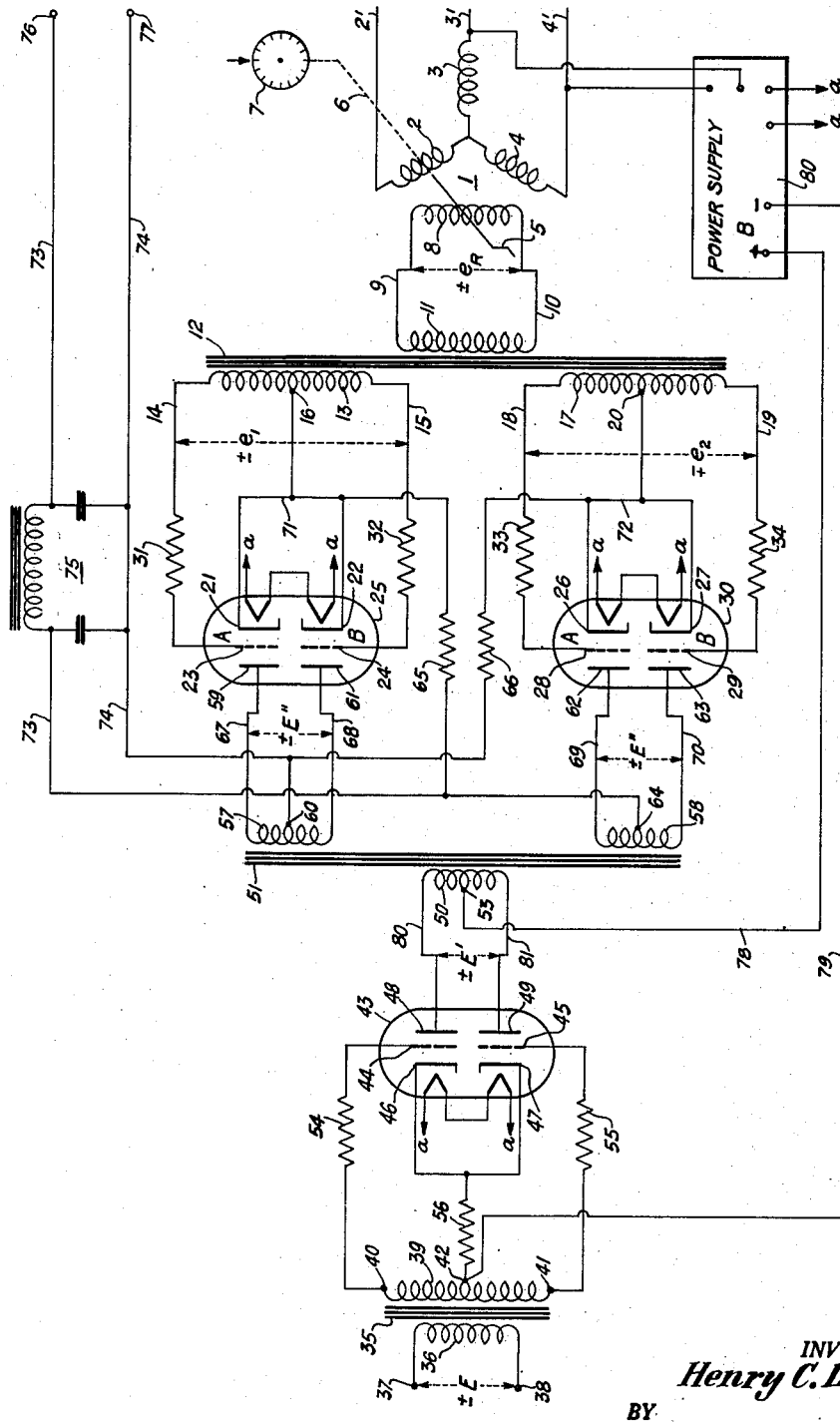
INVENTOR.
*Henry C. Lehde,*
BY
*Edward L. Mueller*
ATTORNEY.

Patented Nov. 10, 1953

2,658,996

UNITED STATES PATENT OFFICE 2,658,996

BIDIRECTIONAL RECTIFIER AND PHASE DETECTOR

Henry C. Lehde, Brooklyn, N. Y., assignor to Control Instrument Company, Inc., New York, N. Y., a corporation of New York Application September 27, 1949, Serial No. 118,135

2 Claims. (Cl. 250—27)

This invention relates to an improved phase detector and bi-directional rectifier means for producing a uni-directional voltage whose magnitude and polarity is uniquely determined by the magnitude and phase, as referred to some reference phase, of an alternating voltage.

Ordinarily, such means comprise variously related amplifiers and rectifiers, controlled and biased by a reference voltage, and applied in such a manner that the output voltage will be determined in polarity by the phase of the input voltage relative to the reference voltage, and be determined in magnitude by the magnitude of the input voltage. All of these applications, however, require that means be provided for adjustment so that, in the absence of input, the output shall be zero; further, these applications which require adjustment means are usually circuits in which the zero output condition for zero input voltage is not a stable one, and changes take place with the aging of the elements comprising these circuits, so that continual adjustment is necessary; and further still, these devices are usually critical as to the magnitude of the biasing voltage employed and the output like as not is a function of the magnitude of the bias voltage as well as of the input voltage.

An object of this invention is, therefore, to produce an improved directional rectifier whose input is an alternating voltage and whose output is a uni-directional voltage which is a function of, and only of, the magnitude and phase of the alternating input voltage, and which is unaffected by aging of components or magnitude of bias voltages, and further, whose output voltage shall be and remain zero whenever the input voltage is zero.

A further object is to produce an improved means, the use of which will permit the time sequence of an unknown voltage to be determined with reference to a voltage of known time sequence with accuracy and simplicity.

The figure is a schematic drawing of the improved demodulator and phase detector constituting the invention.

As may be seen from the drawing, a synchro 1 having a three phase stator comprised of coils, 2, 3 and 4 is connected by way of the terminals 2', 3' and 4' to a source of three phase power (not shown). By means of the crank 5 and the shaft 6, whose extension carries the dial 7, the rotor 8 of the synchro is rotatable within the field of the stator so that the phase of the voltage $e_r$ induced in the rotor is variable in a range of 360° about some chosen reference, which would be indicated by zero on the dial 7.

This voltage, by means of the leads 9 and 10, is introduced into the primary 11 of transformer 12, which transformer is provided with two center tap secondaries; secondary 13, whose polarity with respect to the primary is additive, and secondary 17 whose polarity with respect to primary 11 is subtractive. Thus, the voltage $e_1$ between the leads 14 and 15 is in phase with the voltage in the primary 11 and the voltage $e_2$ between the leads 18 and 19 is 180° out of phase therewith. This is indicated by $e_1$ and $e_r$ being $\pm$ while $e_2$ is $\mp$. Voltage $e_1$ is applied to two grids 23 and 24 of the electron discharge tube 25 which tube contains two complete electron discharge devices 25A and 25B shown as triodes but which may have any other grid controlled configuration. The cathodes 21 and 22 of the electron discharge devices 25A and 25B are connected by means of lead 71 and returned to the center tap 16 of secondary 13. Thus the grids are alternately negative and positive with respect to the common cathode and operate 180° apart in phase.

In a similar manner, $e_2$ is applied to the grids 28 and 29 of the electron discharge tube 30 which tube is similar to the electron discharge tube 25 and comprises the separate elements 30A and 30B. The cathodes 26 and 27 of these devices are connected together by means of lead 72 and are returned to the center tap 20 of secondary 17; thus, these grids also are alternately negative and positive with respect to their common cathodes, operate 180° apart, and as regards sections A and B thereof, 180° apart from sections A and B of the electron discharge device 25. In order to prevent excessive dissipation of power in the grids of the electron discharge devices 25 and 30, the resistors 31, 32, 33 and 34, respectively, are provided in series with the voltages applied thereto, so that the current that the grids may draw is limited by the resistance in series which they provide.

The unknown voltage E is applied to transformer 35 across terminals 37 and 38 of its primary 36. This voltage is then amplified in a conventional, class A, push-pull amplifier in order to obtain a voltage E' which is balanced with respect to ground and proportional to the input. The secondary 39 of transformer 35 is center tapped and two voltages differing in phase by 180°, one of which is in phase with the driving voltage E, are thus obtained; one voltage between terminal 40 and the center tap 42 of winding 39 and the other between terminal 41 and center tap 42 of the same winding. These voltages are applied, through the resistances 54 and 55, to the grids 44 and 45 of the dual electron discharge tube 43 whose cathodes 46 and 47 are connected to the resistor 46 and returned to the center tap 42 of the secondary 39. The plates 48 and 49 of the electron discharge device 43 will be at the same positive potential, but any signal introduced as E will be reproduced as E' between leads 80 and 81, and if the voltage of the power supply and the bias generated by the two currents flowing in resistor 56 are properly adjusted E' will be a linear function of E. Since E' is present across the primary 50 of transformer 51 a similar voltage is present across the secondaries 57 and 58 thereof so that each will deliver voltages across the leads 67 and 68 as well as across leads 69 and 70. These voltages are applied by way of said leads to the anodes, 59, 61, 62 and 63 of the electron discharge tubes 25 and 30.

If the voltages E and $e_r$ are in phase and the transformer polarities are such that during the half cycle, when the terminal 37 is positive, the plate 59 of tube 25A and plate 62 of tube 30A are positive, grid 23 of tube 25A and grid 29 of tube 30B will be positive as well, and the remaining tube elements will be negative. Since only that tube with both a positive grid and plate can conduct, only tube 25A will permit current to flow. On the remaining half cycle anodes 59 and 62 are negative and anodes 61 and 63 are positive; and grids 24 and 28 are simultaneously positive while grids 23 and 29 are negative. Tube 25B will thus be conductive, being the only tube having both grid and anode positive. Therefore, when the unknown voltage and the reference voltage are in phase tube 25 will conduct either by way of section A or section B and, since its cathodes 21 and 22 are joined by way of lead 71 and are in series with resistor 65 to lead 73, lead 73 will be positive and lead 74, which is connected to the center top 60 of secondary 57 which supplies the anodes, will be negative.

If the voltage E were 180° out of phase with the reference voltage $e_r$, then the anode 59 and 62 would be negative and the anodes 61 and 63 would be positive when the grids 23 and 29 were positive and the grids 24 and 28 were negative. By the same reasoning, tube 30B will conduct and upon the reversal of the currents during the remainder of the cycle it may be readily shown that tube 30A will conduct so that the cathodes 26 and 27 of tube 30 which are tied together by means of leads 72 and in series with resistor 66 to lead 74 will be positive and lead 73 which is connected to the center tap 64 of secondary 58 which supplies the anodes of tube 30 will be negative.

It is thus evident that for a 180° reversal in phase of the unknown voltage E with respect to the reference voltage $e_r$ the polarities of leads 73 and 74 will interchange and, since both tubes 25 and 30 are acting as rectifiers, their voltage outputs will be proportional to the voltage applied to their plates.

For that condition in which the voltages are not precisely in phase or in phase opposition, both tubes 25 and 30 will conduct, each during a portion of each cycle; but, since the grids will be positive for only a portion of the time during which the plates are positive as well and since these times are determined entirely by the phase of the plate voltages with respect to the grid voltages, lead 73 will be more positive than lead 74, or vice versa, depending upon the phase sequence and, in addition, there will be an alternating output of twice the frequency of the unknown or reference voltage.

When the phase of E and $e_r$ differ by 90° or 270° each tube will conduct for one quarter of a cycle and the leads 73 and 74 will each be alternately positive and negative for an equal amount of time. The entire output will, therefore, be an alternating voltage without any direct component at all. To avoid an alternating output, the low pass filter 75 of ordinary design is provided to absorb all frequencies above a given minimum frequency, and if its cut-off frequency is less than that of the voltages applied as E or $e_r$ the alternating component put out by the rectifiers will be completely absorbed and the potential difference between the terminals 76 and 77 will be proportional to that component of the voltage E which is not in quadrature with the reference voltage, in this case, zero.

Since the output will be a maximum for that condition in which E and $e_r$ are exactly in phase or in phase opposition, the phase of an unknown voltage may be readily determined by connecting the same to terminals 37 and 38, and then rotating the rotor 8 of the synchro 1 by means of its crank 5 to that point at which the voltage between the terminals 76 and 77 is a maximum and the polarity is such that terminal 76 is positive with respect to terminal 77. This makes voltage $e_r$ in phase with the unknown voltage E and the displacement of the synchro rotor, in degrees as indicated by the dial 7, is the phase displacement of the unknown with respect to the reference. Greater accuracy is obtainable by determining that position of the dial 7 which indicates zero output rather than maximum output, since the null is much sharper than the maximum; at this point the dial will indicate a voltage 90° leading or lagging the unknown voltage and by determining the direction of rotation from this dial setting which would lead to a maximum we may then determine whether to add or subtract from the dial setting to determine the phase of the unknown voltage exactly. However, in using this method care must be taken to determine whether the null setting is an indication for the reference voltage condition which is 90° ahead of or behind that of the unknown voltage. Resetting the rotor of the motor 1 so that the dial is again at zero will reduce the voltage output, and possibly reverse the polarity if the displacement exceeds 90°, and yields an output indicating the magnitude of the in phase component of the unknown voltage and its phase sequence with respect to the reference voltage.

Thus a means has been disclosed through the use of which the phase of an unknown voltage may be actually determined as referred to some reference voltage and whose output is a linear function of the input. The foregoing description, however, is intended to describe rather than to limit and define the inventive idea herein contained, reference being made to the appended claims for that purpose.

What is claimed is:

1. A phase comparator having a reference alternating current voltage input, an unknown alternating current voltage input, and an output circuit; a pair of electron discharge units, each of said units consisting of two anodes, two grids, and a common cathode; energizing means connecting said reference input to said grids; energizing means connecting said anodes to said unknown input; center tapped means connecting said grid energizing means to said common cathode of each respective electron discharge unit; further center tapped means interconnecting said anodes of one discharge unit with the cathodes of the other discharge unit and said output circuit; and further center tapped means interconnecting said anodes of said other discharge unit with the cathodes of said one discharge unit and said output circuit.

2. A phase comparator comprising in combination: first and second electron discharge units each having two anodes, two grids, and a common cathode; means applying to said units a reference voltage and an unknown voltage to be compared in phase; an output circuit; center tapped means connecting the anodes of said first discharge unit and the cathodes of said second discharge unit to said output circuit; center tapped means connecting the anodes of said second discharge unit and the cathodes of said first discharge unit to said output circuit; means applying opposite polarities of said reference voltage to the respective grids in each discharge unit; center tapped means connecting said cathodes of said units to said applying means; and means applying opposite polarities of said unknown voltage to the respective anodes in each discharge unit.

HENRY C. LEHDE.

References Cited in the file of this patent

UNITED STATES PATENTS

| Number | Name | Date |
| --- | --- | --- |
| 1,936,414 | Stone | Nov. 21, 1933 |
| 2,018,268 | Knowles | Oct. 22, 1935 |
| 2,118,770 | Sivertsen | May 24, 1938 |
| 2,281,995 | Purington | May 5, 1942 |
| 2,429,636 | McCoy | Oct. 28, 1947 |